United States Patent [19]

Cumbo et al.

[11] 3,929,915

[45] Dec. 30, 1975

[54] PROCESS FOR THE PRODUCTION OF BUTANEDIOL

[75] Inventors: Charles C. Cumbo, Wilmington; Kamlesh K. Bhatia, Newark, both of Del.

[73] Assignee: E. I. Du Pont de Nemours & Co., Wilmington, Del.

[22] Filed: July 31, 1974

[21] Appl. No.: 493,740

[52] U.S. Cl........ 260/635 E; 260/340.7; 260/346.1; 260/604 R
[51] Int. Cl.² .......................................... C07C 29/16
[58] Field of Search ................................ 260/635 E

[56] References Cited
UNITED STATES PATENTS

| | | | |
|---|---|---|---|
| 2,888,492 | 5/1959 | Fischer et al. | 260/635 E |
| 2,987,524 | 6/1961 | Fischer et al. | 260/340.7 |
| 3,448,157 | 6/1969 | Slaugh et al. | 260/632 HF |
| 3,773,842 | 11/1973 | Schirmann et al. | 260/635 E |

*Primary Examiner*—Joseph E. Evans

[57] ABSTRACT

A three-step process is provided in which (1) acrolein is reacted with 2-methyl-1,3-propanediol(MPD) to prepare 2-vinyl-5-methyl-1,3-dioxane (VMD); (2) the VMD is hydroformylated to yield the corresponding aldehyde and (3) the aldehyde is hydrolyzed and hydrogenated to yield butanediol and 2-methyl-1,3-propanediol. The 2-methyl-1,3-propanediol product is recycled to the first step and the butanediol may be cyclized in the presence of a strong acid to prepare tetrahydrofuran if desired.

11 Claims, No Drawings

PROCESS FOR THE PRODUCTION OF BUTANEDIOL

BACKGROUND OF THE INVENTION

This invention relates to a unique process for preparing butanediol (BAD) and/or tetrahydrofuran (THF).

In prior art processes in which acetals are hydroformylated, hydrolyzed and hydrogenated, a polyol product is obtained following the hydrolysis and hydrogenation step which contains three or more polyols. Because the polyols in any such mixture have very similar physical properties, the separation of the mixture into its component parts is difficult.

SUMMARY OF THE INVENTION

It has now been found that a unique three-step process can be carried out which yields a mixture of only two polyols which can be easily and simply separated from one another. In this process, acrolein is reacted with 2-methyl-1,3-propanediol (MPD) to yield 2-vinyl-5-methyl-1,3-dioxane (VMD) in a first step; the vinyl group on the VMD is hydro-formylated with carbon monoxide and hydrogen in a second step and the acetal aldehyde is hydrolyzed in a third step to yield BAD and MPD. The MPD is then recycled to the first step and the BAD can be cyclized to THF if desired.

DETAILED DESCRIPTION OF THE INVENTION

Step 1 — VMD Formation

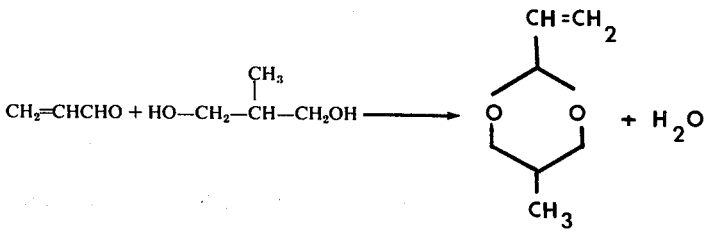

The acrolein can be reacted with MPD using any conventional conditions such as those discussed in U.S. Pat. Nos. 2,729,650 issued Jan. 3, 1956 to Habeshaw et al.; 2,840,615 issued June 24, 1958 to Stautzenberger; 2,987,524 issued June 6, 1961 to Fischer et al., 2,566,559 issued Sept. 4, 1951 to Dolnick & Potash and the like. As described in U.S. Pat. No. 2,566,559, acrolein is reacted with MPD at a molar ratio of MPD to acrolein of 4 to 5:1.

In one preferred process, the acrolein is reacted with MPD in a suitable solvent such as benzene and in the presence of a weak acid catalyst such as a small amount of polyphosphoric acid with the azeotropic distillation of water.

The acrolein may be obtained commercially or it may be prepared from propylene, for example, as described in U.S. Pat. Nos. 3,065,264 and 3,087,964 issued Nov. 20, 1962 and Apr. 30, 1963, respectively, to Koch et al.; 3,387,038 issued June 4, 1968 to Koch; 3,799,978 issued Mar. 26, 1974 to O'Hara et al. and so on. In such processes, propylene is oxidized in the presence of water and oxygen to yield acrolein using molybdenum containing catalysts, generally bismuth molybdate catalysts.

The MPD used in step one is obtained directly as a product of the process of this invention. The self-sustaining aspect of the present process represent a great advantage which makes the process extremely attractive commercially. In addition, MPD is so difficult to obtain that, absent the MPD-generating aspect of this invention, the MPD would have to be prepared from other diols. In such cases, the MPD yields obtained are so low that the process would not be commercially advantageous.

Step 2 — Hydroformylation

In the second step of this process, VMD is reacted with hydrogen and carbon monoxide to prepare the corresponding aldehyde.

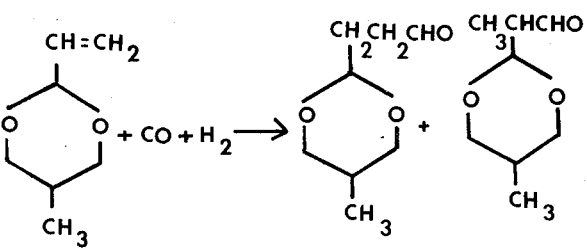

Any conventional hydroformylation reaction conditions can be used to carry out this reaction such as those described in U.S. Pat. Nos. 3,527,809 issued Sept. 8, 1970 to Pruett et al.; 2,880,241 issued Mar. 31, 1959 to V. L. Hughes; 2,729,650 issued Jan. 3, 1956 to Habeshaw et al.; 3,239,566 issued Mar. 8, 1966 to L. H. Slaugh and R. D. Mullineaux; British Patent No. 801,734 issued Sept. 17, 1958 to Esso Research and Engineering and the like.

In a preferred embodiment, VMD is reacted in either a continuous or batch reaction with hydrogen and carbon monoxide at a molar ratio of $H_2:CO$ of 0.9:1 to 1.2:1, preferably 1:1. At ratios lower than 0.9:1, the reaction rates are too slow for commercial utility; at ratios higher than 1.2:1, hydrogenation of VMD occurs as an undesired side reaction. Best yields are obtained at the preferred ratio.

The preferred hydroformylation reaction is carried out in the presence of a rhodium carbonyl complex catalyst at a molar ratio to VMD of $0.5 \times 10^{-3}:1 - 6.0 \times 10^{-3}:1$, preferably $1 \times 10^{-3}:1 - 2 \times 10^{-3}:1$. At the preferred ratios, optimum yields and reaction rates result. The rhodium complex catalyst forms in situ when rhodium in the form of $Rh_6(CO)_{16}$ is added to the hydroformylation reaction mixture containing the ligand described below. The same rhodium carbonyl complex with a trialkyl phosphite may also be prepared first and then added to the reaction mixture.

The phosphite ligand used in the hydroformylation reaction has the formula

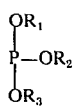

wherein $R_1$, $R_2$ and $R_3$ are the same or different alkyl groups having 1 – 12 carbon atoms such as, for example, methyl, ethyl, propyl, octyl, pentyl, decyl, dodecyl and the like or phenyl. For ease of operation, it is preferred that $R_1$, $R_2$ and $R_3$ are the same. Most preferably, $R_1$, $R_2$ and $R_3$ are the same alkyl groups having 1 – 3 carbon atoms such as trimethyl phosphite, triethyl phosphite, tri-n-propyl phosphite and triisopropyl phosphite since these materials are low boiling and easily separated, purified and recycled into the system. However, higher boiling phosphites within the scope of the above formula may also be used including tri-n-butyl phosphite, triisooctyl phosphite, dimethyldodecyl phosphite, tridecyl phosphite, triphenyl phosphite, methylethylpropyl phosphite, dimethyl phenyl phosphite, methylpropyl phenyl phosphite as well as any other combination within the definition of the above formula and mixtures of any of them.

The phosphite ligand forms a complex with rhodium and carbon monoxide as described in U.S. Pat. No. 3,527,809, and this complex catalyzes the hydroformylation reaction. An excess of the phosphite over that which is required to complex with the rhodium must be used in order to prevent isomerization of the double bond in the VMD and to maximize the yield of linear aldehyde produced in the reaction. The excess ligand is also necessary to insure the stability of the rhodium catalyst throughout the reaction. Generally, a molar ratio of phosphite ligand to rhodium of from 5:1 – 50:1 is employed. In order to obtain optimum reaction rates and produce a product which will favor the formation of butanediol upon hydrolysis and hydrogenation, it is preferred that a ligand:rhodium molar ratio of from 10:1 – 20:1 be employed.

The hydroformylation reaction may be carried out batchwise or continuously as desired in any suitable reactor including a simple low pressure reactor. For ease of operation, it is preferred that the reaction be carried out in a continuous stage reactor through which the acetal flows cocurrently to the flow direction of the carbon monoxide and hydrogen gas. The reactor pressure should be from about 75 – 150 psig, preferably 100 – 110 psig. The reactor temperature should be from about 85° – 115°C., preferably 100° – 110°C. and the residence time in the reactor should be from 0.5 – 5 hours, preferably 1 – 2 hours. At the preferred conditions, the highest yields and best reaction rates are obtained.

After product stream exits from the reactor, the ligand is stripped off in any suitable manner. When the preferred ligands of this invention are used, the reaction product is preferably fed into a ligand stripper column maintained at a pressure of 10 mm. and a temperature of 110°C. Excess ligand is removed and recycled to the reactor. The product stream is then fed to an aldehyde vaporizer column maintained at a pressure of about 8 mm. and a temperature of 120°C. Aldehyde product is distilled off to be used in the hydrolysis-hydrogenation reaction. In order to prevent aldehyde decomposition, the temperature in this step should not exceed 120°C. and the aldehyde residence time should be less than five minutes. The bottom stream from this separation step contains some high boiling by-products which are unavoidably formed as well as all of the rhodium catalyst. This stream is recycled to the reactor after removing a small portion, about one-eighth, of the stream as a purge stream to control the buildup of high boilers. While it has been disclosed that the presence of these high boiling constituents is advantageous in some cases such as, for example, disclosed in U.S. Pat. No. 3,527,809 issued to Pruett on Sept. 8, 1970, it has been found that an acceptable maximum concentration of high boilers in this invention is about 50%, preferably 25%.

Step 3 — Hydrolysis/Hydrogenation

In the third step of this process, the hydroformylation reaction product is hydrolyzed and hydrogenated to prepare BAD and MPD.

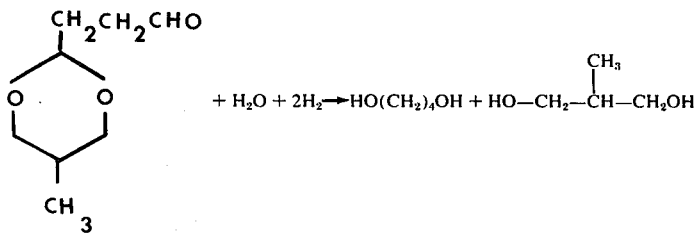

The acetal-aldehyde hydroformylation reaction product can be hydrolyzed and hydrogenated using any of the conventional procedures including those described in U.S. Pat. Nos. 2,729,650; 2,888,492 issued May 26, 1959 to Fisher et al.; 2,721,223 issued Oct. 18, 1955 to Arundale & Mikeska and the like. In a preferred embodiment, water is mixed with the acetal-alhehyde hydroformylation reaction product and the mixture is fed into a hydrogenation reactor at a temperature of 30° – 130°C., a pressure of 100 – 5,000 psig and at a water:aldehyde molar ratio of 1:1 – 20:1. The aldehyde functional group is reduced to the corresponding alcohol in the presence of a catalytic amount of any hydrogenation catalyst such as Raney nickel, for example. As the reaction is continued, the acetal ring is thought to split to yield BAD and MPD which can be separated from one another by conventional distillation techniques. The MPD can then be recycled and used in the preparation of the cyclic acetal of this invention. The BAD can be refined for use as such, for example, as a cross-linking agent in preparing polyurethane polymers, or it can be heated in a cyclization column, for example, to produce tetrahydrofuran.

The invention is further illustrated but is not intended to be limited by the following examples in which all parts and percentages are by weight unless otherwise specified.

Acrolein Preparation

A vapor mixture of propylene, oxygen and water in a mole ratio of 2:1:3 (propylene:oxygen:water) is fed continuously into the reactor at a feed rate of 4 liters of vapor per 100 grams of catalyst per minute (corrected to standard temperature and pressure). The reactor contains a bismuth-promoted strontium-molybdenum precipitated catalyst composed of oxides of molybdenum, strontinum and bismuth in a mole ratio of 1.05:1:0.05 (molybdenum:strontium:bismuth). The reaction zone temperature is maintained at 500°C. As determined by gas chromatography, 29% of the propylene is converted to yield 53% acrolein based on the amount of propylene converted. The exit gas stream also contains CO, $CO_2$, $O_2$, unreacted propylene and a very small amount of other oxygenated compounds. Repetition of this example using a greater amount of water (mole ratio of water to propylene to 5:1) results in an increased percentage of the propylene being converted; the percent yield of acrolein remains approximately unchanged.

VMD Formation

About 45 g. (0.5 mole) of MPD are reacted with 30.8 g. (0.55 mole) of acrolein in 100 ml. of benzene in the presence of 0.2 g. of polyphosphoric acid as a catalyst with azeotropic distillation of water, for thirty minutes or until water distillation ceases. The liquid product is removed and analyzed by gas liquid phase chromatography. The analysis of the product shows 87% conversion to VMD. The distilled VMD product has a boiling point of 62°C. at 24 mm.

Hydroformylation

Into a 400 cc. lined glass autoclave equipped with a stirrer are charged, in an atmosphere of dry nitrogen, 15.4 g. (0.12 mole) of VMD, 0.025 g. (2.3 × $10^{-5}$ mole) of hexarhodium hexadecacarbonyl and 250 μl. of trimethyl phosphite. The molar ratio of trimethyl phosphite to rhodium is 14:3:1. The autoclave is then charged with a 1:1 molar ratio of carbon monoxide-hydrogen gas to a pressure of 95 psig. The contents are heated to 110°C. and the pressure is adjusted to 105 psig, and maintained throughout the reaction. After 55 minutes 96% of the theoretical amount of gas is absorbed by the reaction mixture. At the end of that time the autoclave is cooled and the excess gases are vented. The liquid contents are removed and analyzed by gas-liquid phase chromatography. Analysis of the product shows a 97% conversion of VMD to 2(3'-propanal)-5-methyl-1,3-dioxane and 2(2'-propanol)-5-methyl-1,3-dioxane. About 80 mole percent of 2(3'-propanal)-5-methyl-1,3-dioxane and 12 mole percent of 2(2'-propanol)-5-methyl-1,3-dioxane are obtained. The aldehydes have a normal/iso ratio of 87/13.

Hydrolysis/Hydrogenation 36.4 g. of the aldehydes prepared above are mixed with 30 ml. of a 10% aqueous acetic acid solution and hydrolyzed and hydrogenated at 100°C. and 1,000 psig of hydrogen using 3 g. of 10% palladium on charcoal. The reaction product is filtered and the water and acetic acid removed by distillation. Gas-liquid phase chromatographic analysis of the reaction product shows that only MPD (96% yield) and BAD (98% yield) are formed in the reaction; 0.229 mole MPD and 0.180 mole BAD are obtained. The MPD is recycled to the acetal formation step and the BAD is cyclized to THF in the presence of concentrated sulfuric acid.

EXAMPLES 2-6

Example 1 is repeated except that acrolein is reacted with 0.5 mole of diols other than MPD in Examples 3-6.

TABLE I

| Ex. | Diol | ACETAL FORMATION Acetal |
|---|---|---|
| 2 | MPD | VMD |
| 3 | 2,2-dimethyl-1,3-propanediol | 2-vinyl-5,5-dimethyl-1,3-dioxane |
| 4 | 2-methyl-2,4-pentanediol | 2-vinyl-4,4,6-trimethyl-1,3-dioxane |
| 5 | 1,3-butanediol | 2-vinyl-4-methyl-1,3-dioxane |
| 6 | 2,3-propanediol | 2-vinyl-4-methyl-1,3-dioxolane |

TABLE II

Hydroformylation

| Ex. | Compound | Ligand | Ligand/Rh | Reaction Time | Products (mole %) |
|---|---|---|---|---|---|
| 2 | 2-vinyl-5-methyl-1,3-dioxane 15.4 g, 0.12 mole | 200 μl $(CH_3O)_3P$ | 11.4:1 | 53 min. | 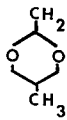 76% A    10% B   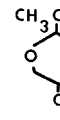 4%   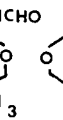 4% |
| 3 | 2-vinyl-5,5-dimethyl-1,3-dioxane 17.1 g, 0.12 mole | 250 μl $(CH_3O)_3P$ | 14.3:1 | 56 min. | 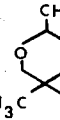 76% A    12% B   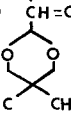 3%   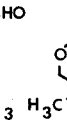 5% |

TABLE II-continued

| Ex. | Compound | Ligand | Ligand/Rh | Reaction Time | Hydroformylation Products (mole %) |
|---|---|---|---|---|---|
| 4 | 2-vinyl-4,4,6-tri-methyl-1,3-dioxane 18.8 g, 0.12 mole | (CH$_3$O)$_3$P | 14.3:1 | 60 min. | 77% A; 12% B; 2%; 5% |
| 5 | 2-vinyl-4-methyl-1,3-dioxane 15.4 g, 0.12 mole | (CH$_3$O)$_3$P | 14.3:1 | 43 min. | 76% A; 14% B; 8%; 3% |
| 6 | 2-vinyl-4-methyl-1,3-dioxolane 13.7 g, 0.12 mole | (CH$_3$O)$_3$P | 14.3:1 | 52 min. | 81% A; 7% B; 1%; 3% |

TABLE III

| Ex. | Amount A and B | Hydrolysis/Hydrogenation % Conversion A | % Conversion B | Products (mole %) |
|---|---|---|---|---|
| 2 | 36.4 g. (0.23 mole) (87% A, 13% B) | 86 | 42 | C 1,4-butanediol (70.2) D 2-methyl-1,3-propanediol (71.6) |
| 3 | 39.6 g. (0.23 mole) (86% A, 14% B) | 90 | 50 | C 1,4-butanediol (73.5) D 2-methyl-1,3-propanediol (6.5) E 2,2-dimethyl-1,3-propanediol (80.0) |
| 4 | 42.8 g. (0.23 mole) 87% A, 13% B | 90 | 50 | C 1,4-butanediol (74.4) D 2-methyl-1,3-propanediol (6.2) E 2-methyl-2,4-pentanediol (80.6) |
| 5 | 36.4 g (0.23 mole) 87% A, 13% B | 87 | 45 | C 1,4-butanediol (71.9) D 2-methyl-1,3-propanediol (5.8) E 1,3-butanediol (77.6) |
| 6 | 33.2 g. (0.23 mole) 87% A, 13% B | 90 | 50 | C 1,4-butanediol (74.4) D 2-methyl-1,3-propanediol (6.0) E 1,2-propanediol (79.0) |

By contrast to the results achieved in Examples 1 and 2, Examples 3–6, yield more than two diols. Further, in each of Examples 3–6, the diols produced other than BAD are not suitable for use in the preparation of the VMD of this invention as is the MPD of Examples 1 and 2.

While the invention has been described in considerable detail in the foregoing, it is to be understood that such detail is solely for the purpose of illustration and that variations can be made by those skilled in the art without departing from the spirit and scope of the invention except as set forth in the claims.

What is claimed is:

1. A three-step process for preparing a 1,4-butanediol which comprises reacting acrolein with 2-methyl-1,3-propanediol under conventional conditions to produce 2-vinyl-5-methyl-1,3-dioxane, hydroformylating the 2-vinyl-5-methyl-1,3-dioxane under conventional conditions to produce the corresponding aldehyde of 2-vinyl-5-methyl-1,3-dioxane and then hydrolyzing and hydrogenating the aldehyde of 2-vinyl-5-methyl-1,3-dioxane under conventional conditions to obtain a mixture of 1,4-butanediol and 2-methyl-1,3-propanediol.

2. The process of claim 1 wherein the 2-methyl propanediol is recycled to react with acrolein.

3. The process of claim 1 wherein acrolein is reacted with 2-methyl-1,3-propanediol at a temperature of 0° to 75°C. in the presence of a strongly acidic ion exchange resin.

4. The process of claim 1 wherein the 2-vinyl-5-methyl-1,3-dioxane is hydroformylated by reacting it with hydrogen and carbon monoxide for about 1–5 hours at a molar ratio of $H_2$:CO of 0.9:1 – 1.2:1 in the presence of a rhodium carbonyl catalyst at a molar ratio to the cyclic acetal of $0.5 \times 10^{-3}$ to $6.0 \times 10^{-3}$ and a phosphite having the formula

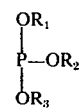

wherein $R_1$, $R_2$ and $R_3$ are the same or different alkyl groups having 1 – 12 carbon atoms or phenyl at a molar ratio to the rhodium catalyst of about 5:1 – 50:1 at a temperature of 85° – 110°C. and a pressure of about 75 – 150 psig.

5. The process of claim 4 wherein $R_1$, $R_2$ and $R_3$ are the same alkyl groups having 1–3 carbon atoms.

6. The process of claim 4 wherein the reaction is carried out for about 2 – 3 hours.

7. The process of claim 4 wherein the molar ratio of $H_2$:CO is 1:1.

8. The process of claim 4 wherein the molar ratio of the rhodium catalyst to the cyclic acetal is $1 \times 10^{-3}$ to $2 \times 10^{-3}$.

9. The process of claim 4 wherein the molar ratio of the phosphite to the rhodium catalyst is 10:1 – 20:1.

10. The process of claim 4 wherein the temperature is 100° – 110°C. and the pressure is 100 – 110 psig.

11. The process of claim 2 wherein the aldehyde of 2-vinyl-5-methyl-1,3-dioxane is mixed with water at a molar ratio of water to the aldehyde of 1:1 – 20:1 and then hydrolyzed and hydrogenated in the presence of a catalytic amount of a conventional hydrogenation catalyst at a temperature of 30° – 130°C. and a pressure of 100 – 5,000 psig.

* * * * *